US010325187B2

(12) United States Patent
Staton et al.

(10) Patent No.: US 10,325,187 B2
(45) Date of Patent: Jun. 18, 2019

(54) MOBILE PRINTER

(71) Applicant: NEWTONOID TECHNOLOGIES, L.L.C., Liberty, MO (US)

(72) Inventors: Fielding B. Staton, Liberty, MO (US); David Strumpf, Columbia, MO (US)

(73) Assignee: Newtonoid Technologies, L.L.C., Liberty, MO (US)

( * ) Notice: Subject to any disclaimer, the term of this patent is extended or adjusted under 35 U.S.C. 154(b) by 0 days.

(21) Appl. No.: 15/958,867

(22) Filed: Apr. 20, 2018

(65) Prior Publication Data

US 2018/0307951 A1    Oct. 25, 2018

Related U.S. Application Data

(60) Provisional application No. 62/487,621, filed on Apr. 20, 2017.

(51) Int. Cl.
| | |
|---|---|
| G06K 15/10 | (2006.01) |
| H04N 1/00 | (2006.01) |
| G06K 15/14 | (2006.01) |
| G06K 15/00 | (2006.01) |

(52) U.S. Cl.
CPC .......... *G06K 15/102* (2013.01); *G06K 15/14* (2013.01); *G06K 15/4025* (2013.01); *H04N 1/00286* (2013.01); *H04N 1/00307* (2013.01); *H04N 1/00551* (2013.01)

(58) Field of Classification Search
USPC ...................................................... 358/1.13
See application file for complete search history.

(56) References Cited

U.S. PATENT DOCUMENTS

| | | | |
|---|---|---|---|
| 4,190,845 | A | 2/1980 | Cooper et al. |
| 4,978,971 | A | 12/1990 | Goetz et al. |
| 5,289,208 | A | 2/1994 | Haselby |
| 6,218,639 | B1 | 4/2001 | Bulle |

(Continued)

OTHER PUBLICATIONS

Brother International Corporation, User's Guide PocketJet PJ-522 and PJ-523 Mobile Printer, undated, 82 pages—Applicant admitted prior art.

(Continued)

*Primary Examiner* — Ngon B Nguyen
(74) *Attorney, Agent, or Firm* — Lathrop Gage L.L.P.

(57) ABSTRACT

A mobile printer for use with a piece of paper includes a computer memory, a processor in data communication with the computer memory, an input device in data communication with the processor, a housing configured to rest atop the paper, a carriage located inside the housing, carriage actuators for moving the carriage adjacent the paper, a scanning device coupled to the housing and positioned to obtain existing-indicia information, and a printing unit coupled to and movable with the carriage. The scanning device and the carriage actuators are in data communication with the processor. The printing unit includes an output nozzle and a supply passage for supplying ink from a reservoir to the output nozzle. Programming causes the scanning device to obtain the existing-indicia information, the computer memory to store the obtained existing-indicia information, the carriage actuators to selectively move the carriage, and the ink to pass from the output nozzle.

27 Claims, 15 Drawing Sheets

(56) References Cited

U.S. PATENT DOCUMENTS

| | | | |
|---|---|---|---|
| 6,411,397 B1* | 6/2002 | Petteruti | G06K 15/00 |
| | | | 358/1.14 |
| 2006/0088355 A1* | 4/2006 | Ribi | B41J 3/28 |
| | | | 400/88 |
| 2009/0231374 A1 | 9/2009 | Van de Wynckel et al. | |
| 2017/0140255 A1* | 5/2017 | Norasak | G06K 15/021 |
| 2018/0229497 A1* | 8/2018 | Darrow | B41J 2/04505 |

OTHER PUBLICATIONS

Zutalabs, The Robotic Printer, https://www.zutalabs.com, dated Jun. 20, 2018, 1 page—Applicant admitted prior art.
PCT Application No. PCT/US 18/28649, International Search Report and Written Opinion, dated Sep. 18, 2018, 14 pages.

* cited by examiner

MOBILE PRINTER

CROSS-REFERENCE TO RELATED APPLICATIONS

This application claims priority to U.S. Provisional Patent Application No. 62/487,621, filed Apr. 20, 2017, entitled Mobile Printer, which is incorporated by reference herein in its entirety.

BACKGROUND

Printing devices compatible with word processing and graphics software are standard pieces of office equipment and are also commonly found in homes. Such devices are typically large and operate using inkjet or laser technologies—though other printing technologies (e.g., thermal technology) may also be used, and especially in printers that are more mobile. Example PRIOR ART mobile printers are sold by Brother International Corporation under the trademark POCKETJET®. One particular PRIOR ART mobile printer 5 is shown in FIGS. 1a and 1b and described in User's Guide, PJ-522 and PJ-523Mobile Printer, by Brother International Corporation. As the User's Guide describes, even when printers are marketed as mobile, they move paper across the printing technology and are wider than the piece of paper to be printed upon.

Embodiments of the current invention relate generally to mobile printers.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere.

According to one embodiment, a mobile printer is provided for use with a stationary piece of paper. The mobile printer includes a non-transitory computer memory, a processor in data communication with the computer memory, an input device in data communication with the processor, a housing configured to rest atop the paper, a carriage located inside the housing, carriage actuators for moving the carriage laterally and transversely adjacent the paper, a scanning device coupled to the housing and positioned to obtain existing-indicia information, and a printing unit coupled to and movable with the carriage. The scanning device and the carriage actuators are in data communication with the processor. The printing unit includes an output nozzle and a supply passage for supplying ink from an ink reservoir to the output nozzle. Programming causes the scanning device to obtain the existing-indicia information, the computer memory to store the obtained existing-indicia information, the carriage actuators to selectively move the carriage, and the ink to pass from the output nozzle.

According to another embodiment, a mobile printer is provided for use with a stationary piece of paper. The mobile printer includes a non-transitory computer memory, a processor in data communication with the computer memory, an input device in data communication with the processor, a housing configured to rest atop the paper, a scanning device in data communication with the processor, an ink reservoir, and a stationary array of output nozzles in communication with the ink reservoir. The scanning device is coupled to the housing and positioned to obtain existing-indicia information. Programming causes the scanning device to obtain the existing-indicia information, the computer memory to store the obtained existing-indicia information, and the ink to pass from the stationary array of output nozzles.

According to still another embodiment, a mobile printer is provided for use with stationary indicia-receiving material. The mobile printer includes a non-transitory computer memory, a processor in data communication with the computer memory, an input device in data communication with the processor, a housing configured to rest adjacent the indicia-receiving material, a scanning device in data communication with the processor, an ink reservoir, an output nozzle in communication with the ink reservoir, and a nozzle actuator in data communication with the processor. The scanning device is coupled to the housing and positioned to obtain existing-indicia information. Programming causes the scanning device to obtain the existing-indicia information, the computer memory to store the obtained existing-indicia information, and the nozzle actuator to selectively activate to cause ink from the ink reservoir to pass from the output nozzle.

According to yet another embodiment, a mobile printer is provided for use with a transfer sheet overlying a stationary indicia-receiving material. The transfer sheet is configured to change pigmentation of areas of the indicia-receiving material underlying areas of the transfer sheet receiving focused waves. The mobile printer includes a non-transitory computer memory, a processor in data communication with the computer memory, an input device in data communication with the processor, a housing configured to rest adjacent the indicia-receiving material, a scanning device in data communication with the processor, and a transmitter in data communication with the processor. The scanning device is coupled to the housing and positioned to obtain existing-indicia information. Programming causes the scanning device to obtain the existing-indicia information, the computer memory to store the obtained existing-indicia information, and the transmitter to activate (causing the transfer sheet to change pigmentation of areas of the indicia-receiving material underlying areas of the transfer sheet receiving focused waves from the transmitter).

DETAILED DESCRIPTION

Figure 1A:
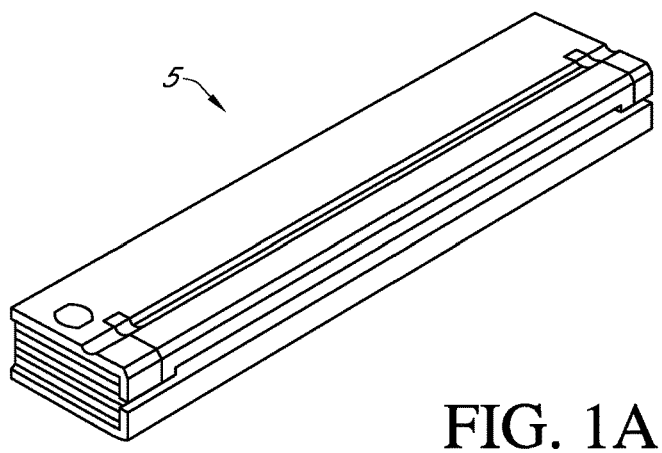
FIG. 1a is a perspective view of a PRIOR ART printer.
Figure 1B:
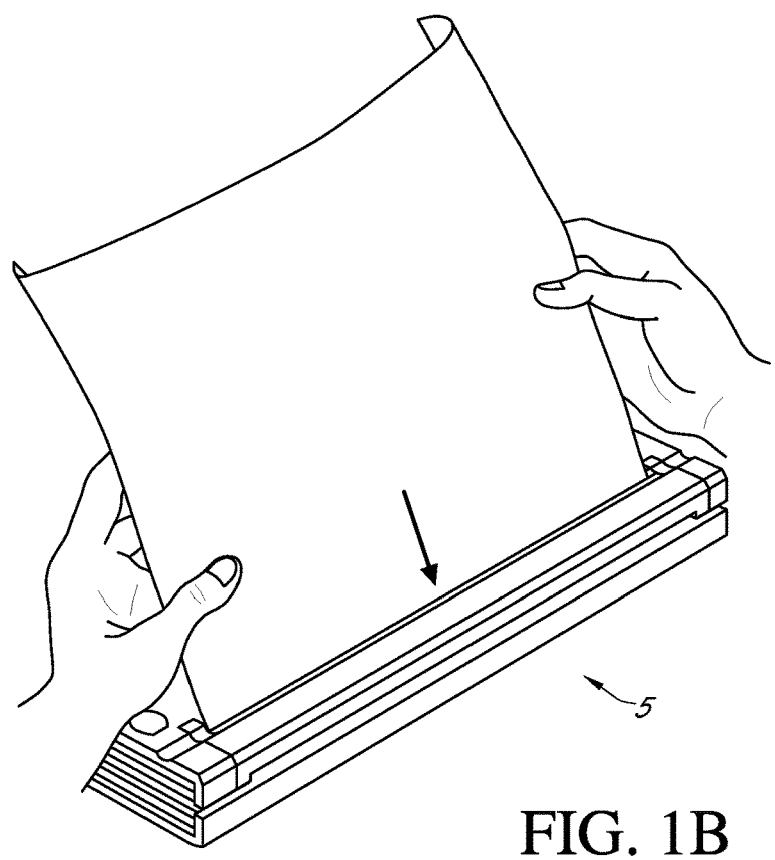
FIG. 1b is a perspective view of the PRIOR ART printer of FIG. 1a, shown in use with a piece of paper.

FIGS. 2 through 10 illustrate a mobile printer according to an embodiment 100 of the current invention. The mobile printer 100 includes a housing 101, non-transitory computer memory 110, a processor 120, a scanning device 130, an input 140, a carriage 150, carriage actuators 160, a printing unit 170, and various programming as discussed below.

The housing 101 (FIGS. 2 through 6) is portable and may be constructed of plastics, composites, metals, smart materials, and any other appropriate materials and combinations of materials. In some embodiments, the housing 101 may have a width 101a of about 2½ to 3 inches, a length 101b of about 5 to 5½ inches, and a height 101c of about ½ to 1 inch. In other embodiments, the width 101a may be about 9 to 9½ inches, the length 101b may be about 11½ to 12 inches, and the height 101c may be about ½ to 1 inch. In still other embodiments, other appropriate dimensions 101a, 101b, 101c may be selected so long as the housing 101 remains configured to rest atop stationary indicia-receiving material 10 and be easily handheld. And in yet other embodiments, the housing 101 may be incorporated into a larger system or subsystem; for example, the housing 101 may be part of a robotic "hand" or industrial manufacturing machinery.

Figure 3:
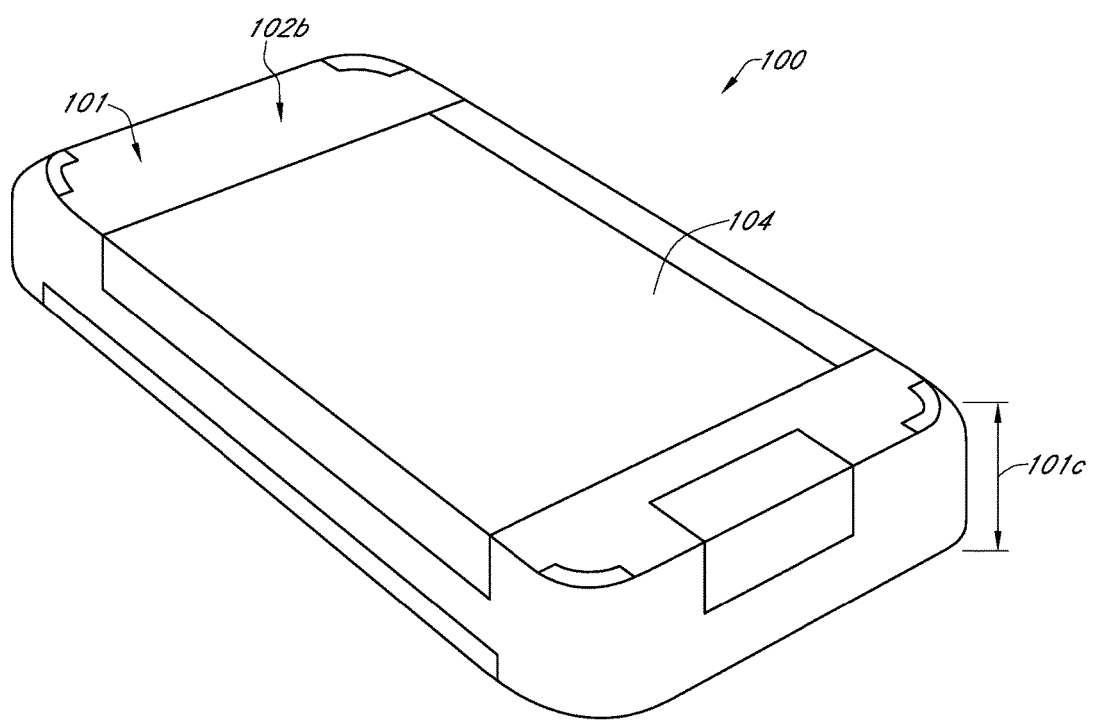
FIG. 3 is a bottom perspective view of the mobile printer of FIG. 2.
Figure 5:
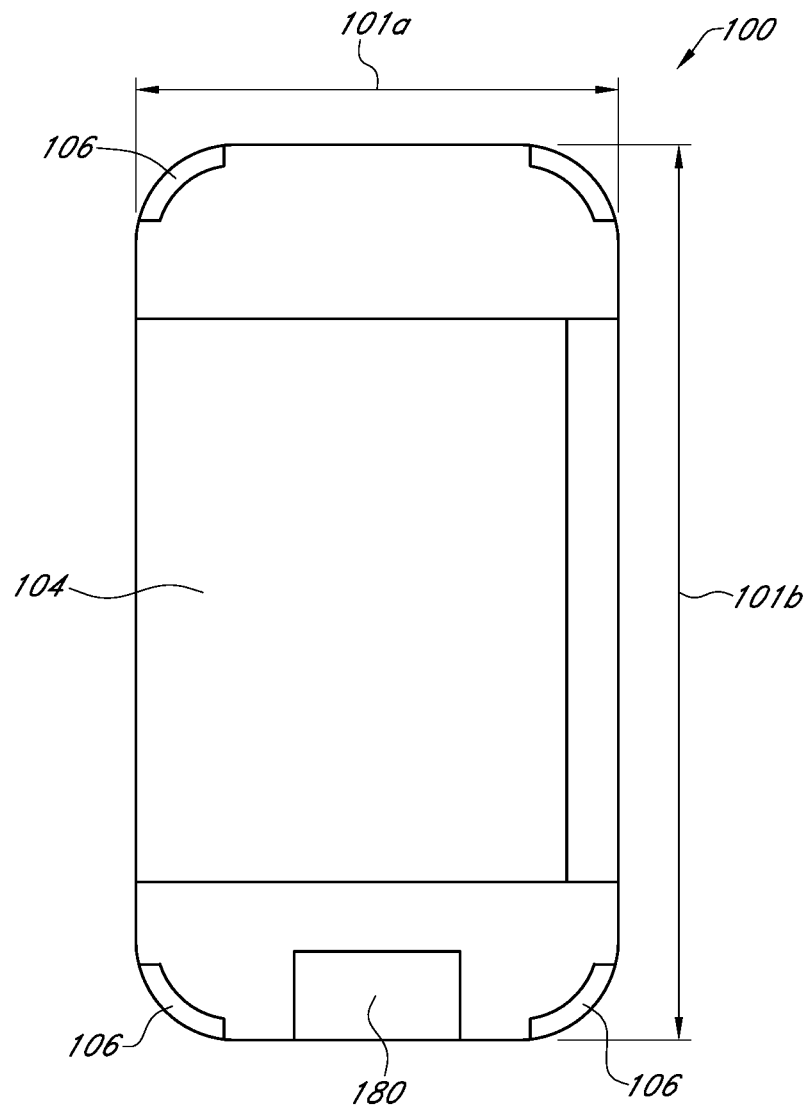
FIG. 5 is a bottom view of the mobile printer of FIG. 2.
Figure 6:
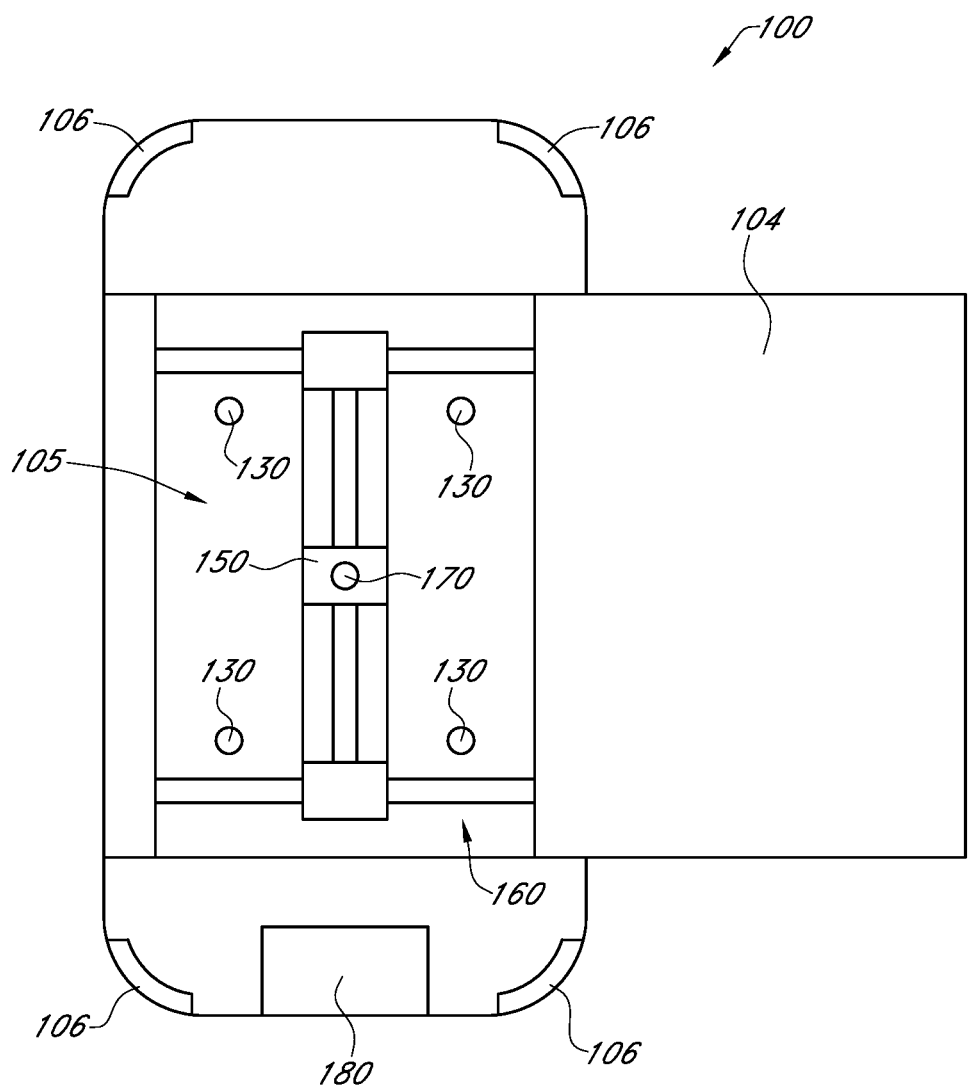
FIG. 6 is a bottom view of the mobile printer of FIG. 2, shown with the printing cover at an open position.
Figure 7:
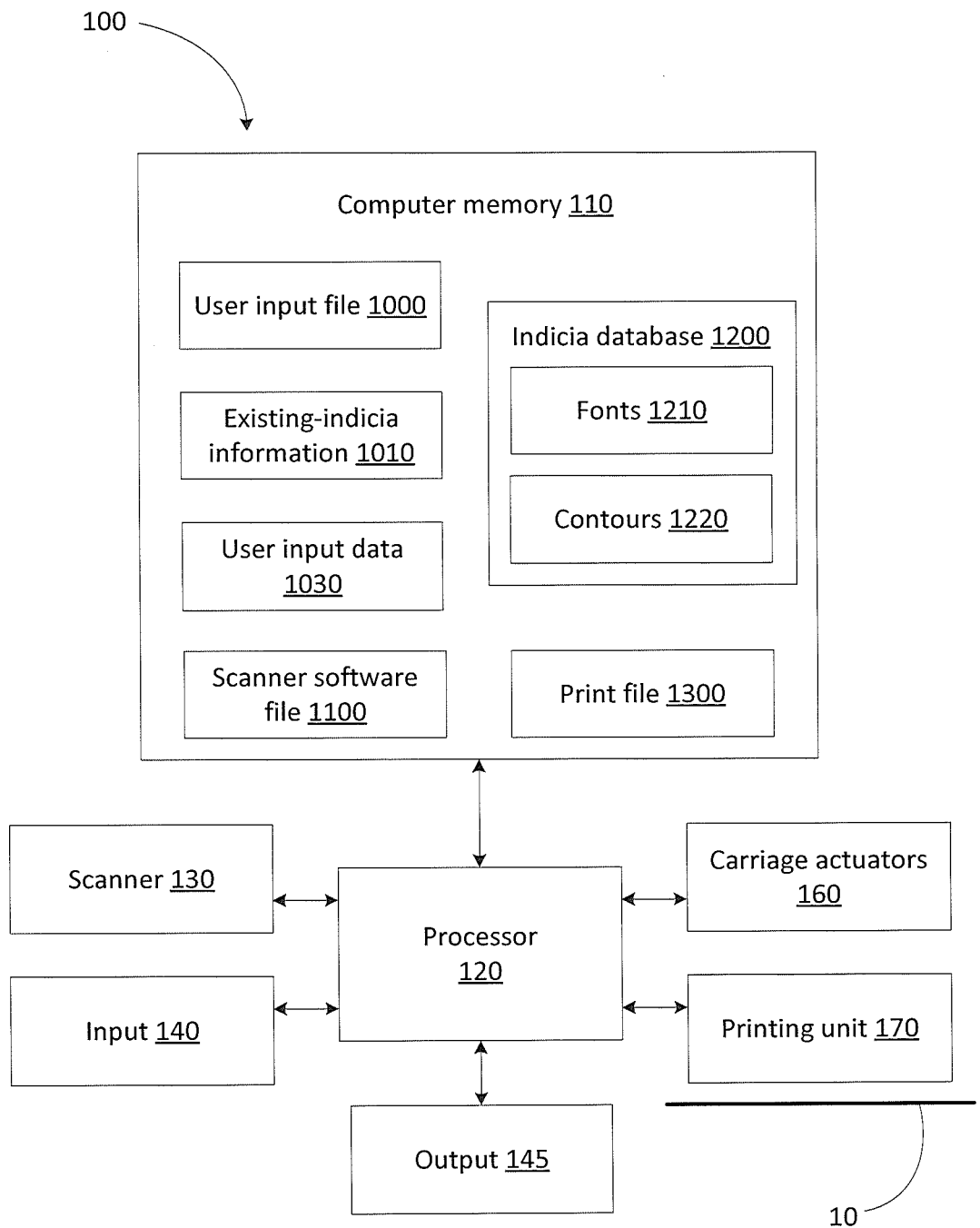
FIG. 7 is a block diagram illustrating aspects of the mobile printer of FIG. 2.

The illustrated housing 101 has a top side 102a, a bottom side 102b, and opposed ends 102c, 102d. FIGS. 3, 5, and 6 illustrate a door 104 at the bottom side 102b that is movable to selectively expose and cover an inner area 105. The door 104 may slide along a track, pivot, be entirely separable, or otherwise move to expose and cover the inner area 105. The bottom side 102b may include spacers 106 upon which the housing 101 may rest when positioned with the bottom side 102b pointed down.

The computer memory 110 (FIG. 7) may include volatile and non-volatile memory, and any appropriate data storage devices whether now existing or later developed may be used. Further, the computer memory 110 may be a unitary memory in one location, or may alternately be a distributed computer memory such that one portion of the computer memory is physically separate from another portion of the non-transitory computer memory. In other words, discrete computer memory devices may be linked together (e.g., over a network) and collectively form the computer memory 110. Computer memory 110 may also include a portion of the output product that may result from the intended functions of the mobile printer 100. In other words, mobile printer 100 may create output printing results that contain identifiable content that can be viewed or scanned and decoded as network distributed computer memory 110 by a user or a mechanized scanning peripheral (e.g., scanner 130). While this document shall often refer to elements in the singular, those skilled in the art will appreciate that multiple such elements may often be employed and that the use of multiple such elements which collectively perform as expressly or inherently disclosed is fully contemplated herein.

The processor 120 (FIG. 7) may be any appropriate device, whether now existing or later developed, which performs the operations specified by the various programming used by the mobile printer 100. The processor 120 may be electronic circuitry located on a common chip or circuit board, or may be a distributed processor such that one portion of the processor is physically separate from another portion of the processor. The processor 120 is in data communication with the computer memory 110, the scanner 130, the input 140, the output 145, the carriage actuators 160, and the printing unit 170.

The scanner 130 (FIG. 7) includes at least one camera to capture existing-indicia information 1010 (which may include, for example, text and non-textual graphics on indicia-receiving material 10). The indicia-receiving material 10 may be, for example, paper, lumber, building materials, industrial products, and consumer goods. In some embodiments, it may be desirable for the indicia-receiving material 10 to be generally flat, at least on an indicia-receiving surface. The scanner 130 may further include the ability to detect color (or "tone") information 1020, either through the camera 130 or different sensors. Tone information 1020 may include, for example, information about the tint of the existing indicia at various locations of the indicia-receiving material 10. FIG. 6 shows that multiple sensors 130 may be coupled to the housing 101, positioned to obtain the existing-indicia information 1010 while the housing 101 rests atop the indicia-receiving material 10.

Figure 2:
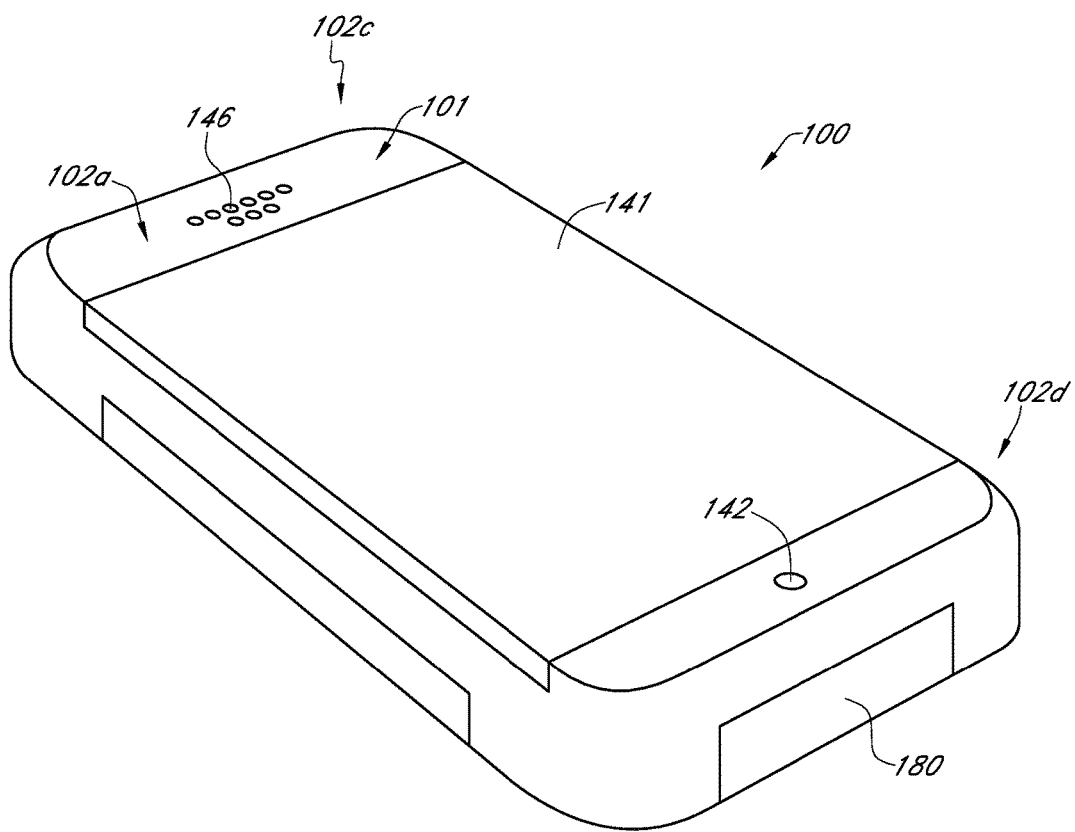
FIG. 2 is a top perspective view of a mobile printer, according to an embodiment of the current invention.
Figure 4:
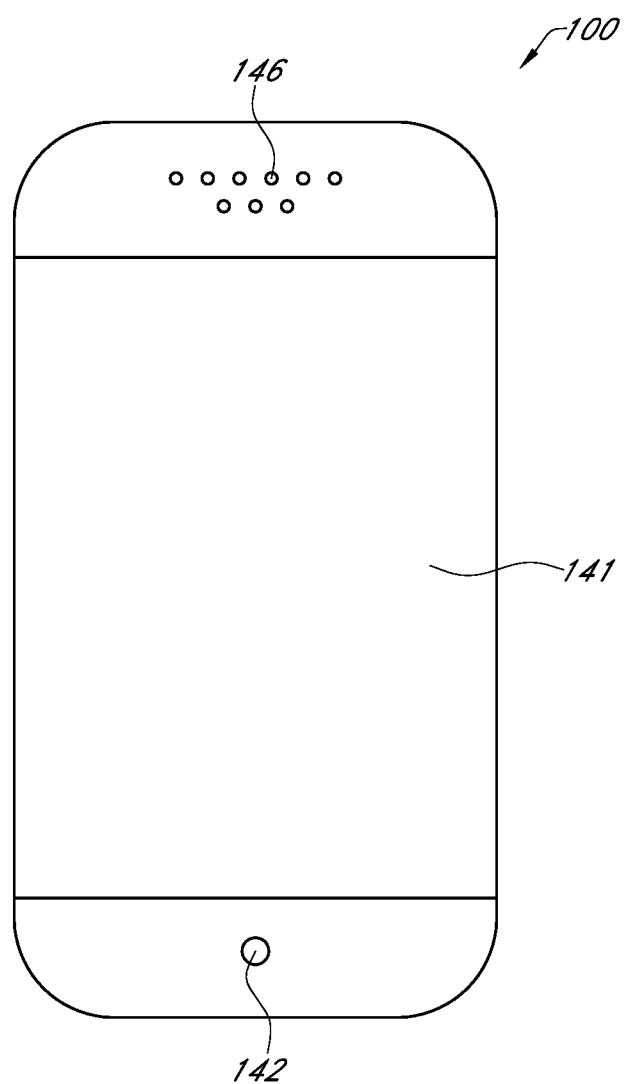
FIG. 4 is a top view of the mobile printer of FIG. 2.

The input 140 (FIG. 7) may be any input device (whether now existing or later developed) allowing a person to input data 1030 to the processor 120 for storage in the computer memory 110. For example, the input 140 may be a touchscreen 141 (as shown in FIGS. 2 and 4), a keyboard, a computer mouse, a microphone 142 (as shown in FIGS. 2 and 4), a camera, a spectral scanner, or a barcode reader. Data 1030 is discussed in additional detail below.

The output 145 (FIG. 7) may be any appropriate output device (whether now existing or later developed). For example, the output 145 may be one or more of a visual display (e.g., touchscreen 141 shown in FIGS. 2 and 4) and an audible output (e.g., speaker 146 shown in FIGS. 2 and 4). The output 145 may be used to entertain the user in addition to providing interaction with the processor 120. For example, the output 145 may provide visual/audible programming (either preset or selectable), requests for data or user instructions, et cetera.

Figure 8:
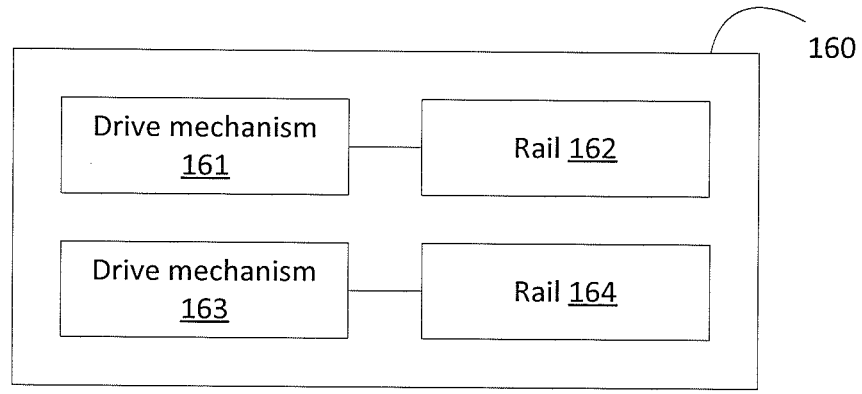
FIG. 8 is a block diagram illustrating other aspects of the mobile printer of FIG. 2.

The carriage 150 (FIG. 6) is located in the housing inner area 105 and supports the printing unit 170. The carriage 150 is selectively moved (preferably in at least two dimensions—laterally and transversely adjacent the indicia-receiving material 10) by the carriage actuators 160. In essence, the carriage 150 and the carriage actuators 160, together with software and processing, equate to a computer numerical control ("CNC") system. One prior art CNC system is disclosed in U.S. Pat. No. 6,218,639 to Bulle, which forms part of the current disclosure. As shown in FIG. 8, the carriage actuators 160 may include a drive mechanism 161 and rail 162 system which allows lateral travel and a drive mechanism 163 and rail 164 system which allows transverse travel. Drive mechanisms providing travel along rails in CNC systems are disclosed, for example, in Bulle. Those skilled in the art will appreciate that the rails may be channels or other appropriate structure.

Figure 9:
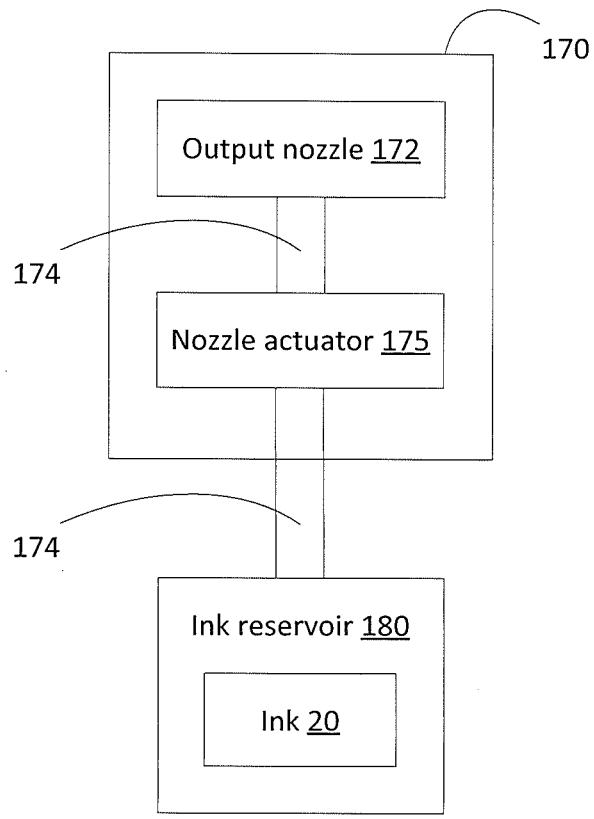
FIG. 9 is a block diagram illustrating still other aspects of the mobile printer of FIG. 2.
Figure 10:
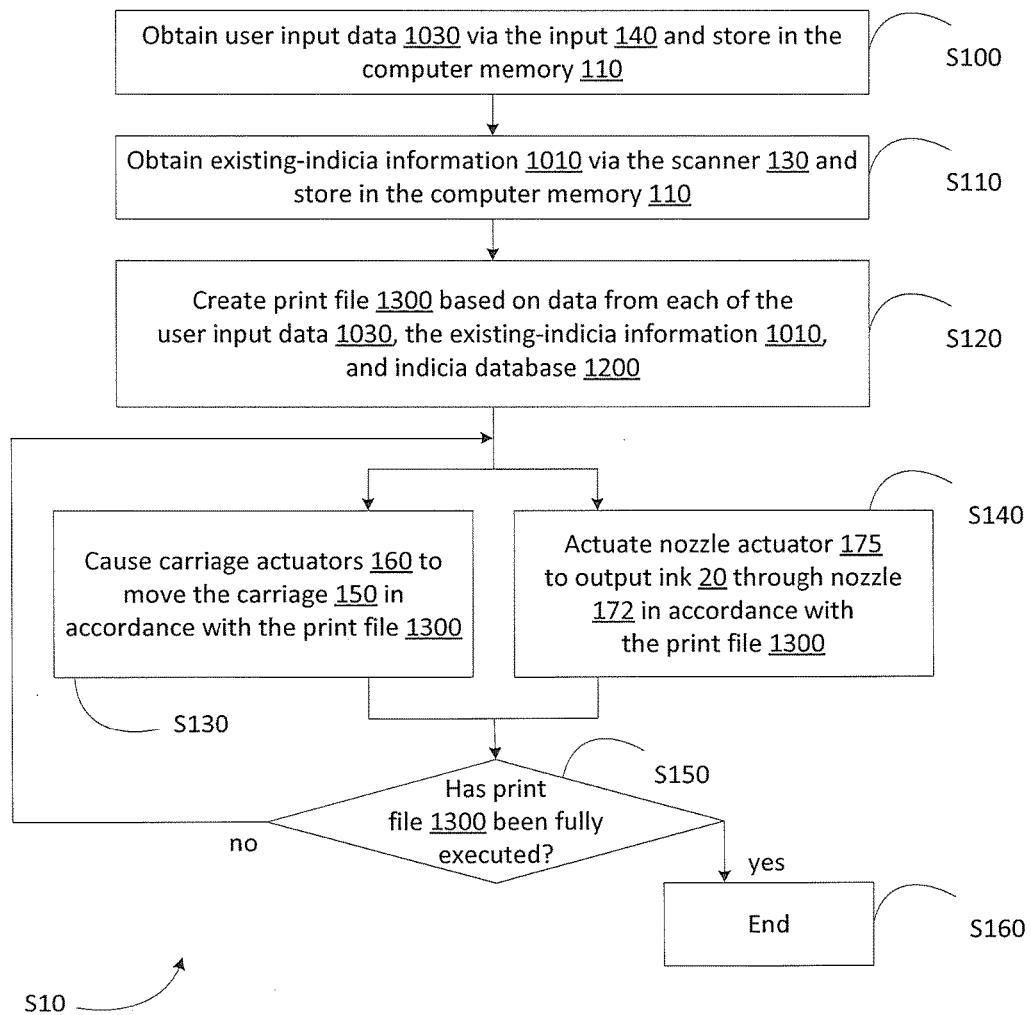
FIG. 10 is a flowchart illustrating various steps performed by the mobile printer of FIG. 2.

The printing unit 170 is coupled to and movable with the carriage 150, as shown in FIG. 6. As shown in FIG. 9, the printing unit 170 may include an output nozzle 172, a supply passage 174 for supplying the ink 20 from an ink reservoir 180 to the output nozzle 172, and a nozzle actuator 175 in communication with the processor 120 for causing the ink 20 to pass from the output nozzle 172. Nozzle actuators are well known in the art, and may include a heater (often referred to as thermal inkjet or thermal Drop On Demand "DOD" printing) or a piezoelectric material (often referred to as piezo inkjet or piezo DOD printing).

Returning now to FIG. 7, the computer memory 110 has various files and subfiles for containing programming and data. A user input file 1000, existing-indicia information 1010, a scanner software file 1100, an indicia database 1200, and a print file 1300 are illustrated. The indicia database 1200 includes font information 1210 (e.g., information allowing fonts to be recognized in existing indicia, and allowing fonts to be utilized) and contour information 1220 (e.g., geometric routines for matching/filling lines in the existing indicia, and for creating other lines/shapes). Programming, for example in the scanner software file 1100, causes the scanning device 130 to obtain (in some embodiments, repeatedly obtain) the existing-indicia information 1010, and causes the obtained information 1010 to be stored. Other programming (e.g., in the user input file 1000) allows input data 1030 to be obtained through the input 140 and stored. The input data 1030 may include, for example, desired textual and non-textual indicia to be printed on the indicia-receiving material 10. And still other programming causes the processor 120 to create the print file 1300 based on data from the existing-indicia information 1010, the user input data 1030, and the indicia database 1200. And using the print file 1300, the processor 120 causes the carriage actuators 160 to selectively move the carriage in a defined manner and causes the nozzle actuator 175 to expel the ink 20 from the output nozzle 172 to apply the ink 20 to the indicia-receiving material 10. If the existing-indicia information 1010 is repeatedly obtained, programming may compare the obtained existing-indicia information 1010 to identify movement of the housing 101 relative to the paper 10—allowing adjustments to be made in the printing process.

The following description is an example of the mobile printer 100 in use with paper 10 according to an embodiment. At step S100 of method S10, the processor 120 obtains user input data 1030 via the input 140 and stores the user input data 1030 in the computer memory 110. And at step S110, the processor 120 obtains existing-indicia information 1010 via the scanner 130 and stores the existing-indicia information 1010 in the memory 110. At step S120, the processor 120 creates print file 1300 based on data from the existing-indicia information 1010, the user input data 1030, and the indicia database 1200.

After step S120, the process S10 proceeds to steps S130 and S140. There, the processor 120 causes the carriage actuators 160 to move the carriage 150 in accordance with the print file 1300, and causes the nozzle actuator 175 to selectively allow the ink 20 to flow through the supply passage 174 and the output nozzle 172 to apply the ink 20 to the paper 10. After steps S130 and S140, the processor 120 determines at S150 if the print file 1300 has been fully executed for the ink 20. If not, the process S10 returns to steps S130 and S140; if so, the process S10 ends at step S160.

Figure 11:
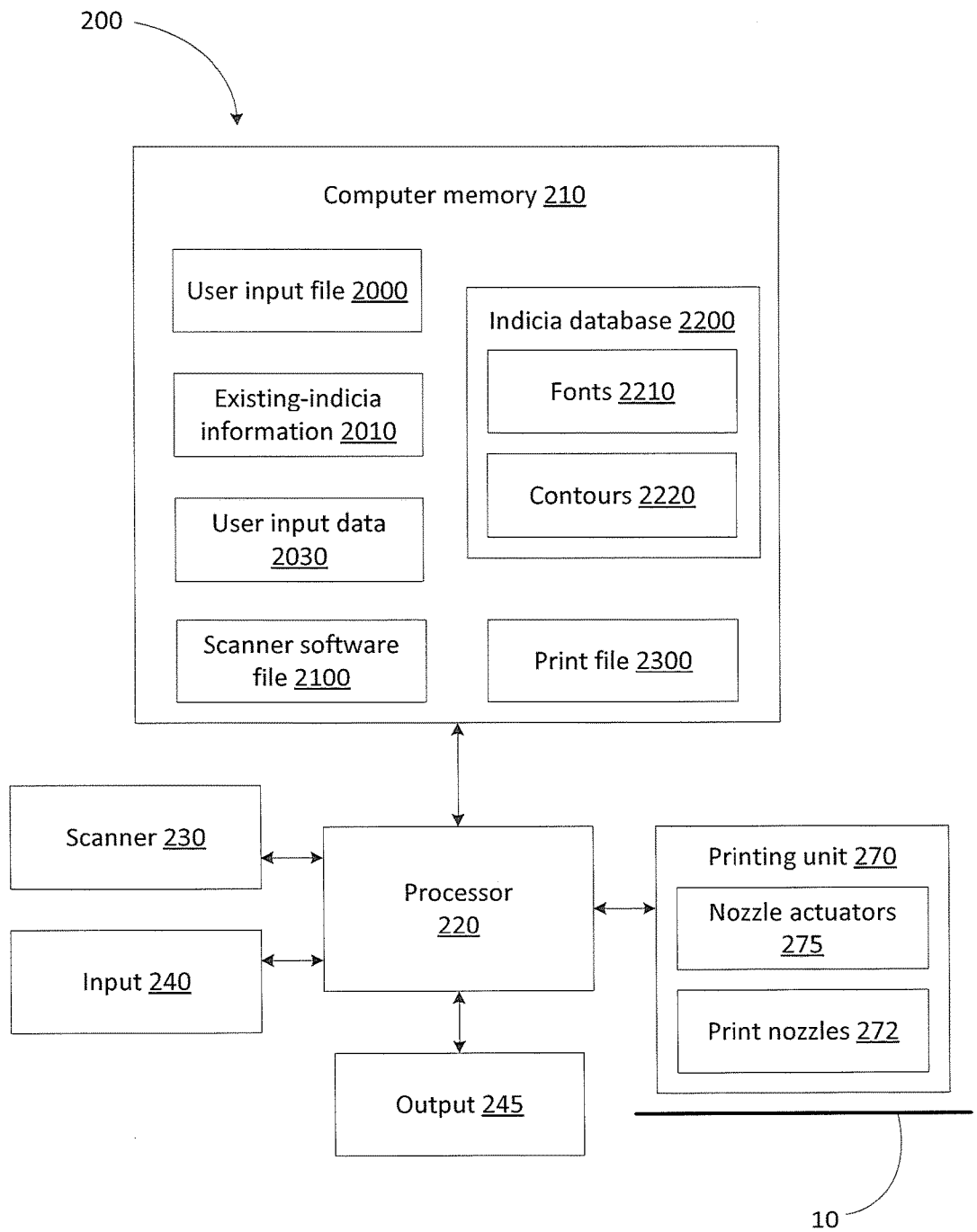
FIG. 11 is a block diagram illustrating a mobile printer according to another embodiment of the current invention.

FIG. 11 illustrates another mobile printer 200 that is substantially similar to the embodiment 100, except as specifically noted and/or shown, or as would be inherent. Further, those skilled in the art will appreciate that the embodiment 100 (and thus the embodiment 200) may be modified in various ways, such as through incorporating all or part of any of the various described embodiments, for example. For uniformity and brevity, reference numbers from 200 to 299 may be used to indicate elements corresponding to those discussed above numbered from 100 to 199 (e.g., computer memory 210 corresponds generally to the computer memory 110, processor 220 corresponds generally to the processor 120, scanner 230 corresponds generally to the scanner 130, input 240 corresponds generally to the input 140, output 245 corresponds generally to the output 145, et cetera), though with any noted, shown, or inherent deviations. And reference numbers 2000 to 2999 may be used to indicate elements corresponding to those discussed above numbered from 1000 to 1999 (e.g., user input file 2000 corresponds generally to the user input file 1000, existing-indicia information 2010 corresponds generally to the existing-indicia information 1010, user input data 2030 corresponds generally to the user input data 1030, scanner software file 2100 corresponds generally to the scanner software file 1100, the indicia database 2200 corresponds generally to the indicia database 1200, font information 2210 corresponds generally to the font information 1210, contour information 2220 corresponds generally to the contour information 1220, and print file 2300 corresponds generally to the print file 1300), though with any noted, shown, or inherent deviations.

In embodiment 200, the printing unit 270 includes a stationary array of print nozzles 272 in the housing inner area 105 (each substantially similar to a print nozzle 172 and actuated by a nozzle actuator 275 substantially similar to the nozzle actuators 175), and does not include a carriage or carriage actuators corresponding to the carriage 150 and the carriage actuators 160. In use, the processor 220 activates the desired nozzle actuators 275 in the stationary array in accordance with the print file 2300 to output the ink 20 through the nozzles 272, either in series or parallel, and thus apply the ink 20 to the indicia-receiving material 10 without any lateral or transverse movement relative to the stationary indicia-receiving material 10.

Figure 12:
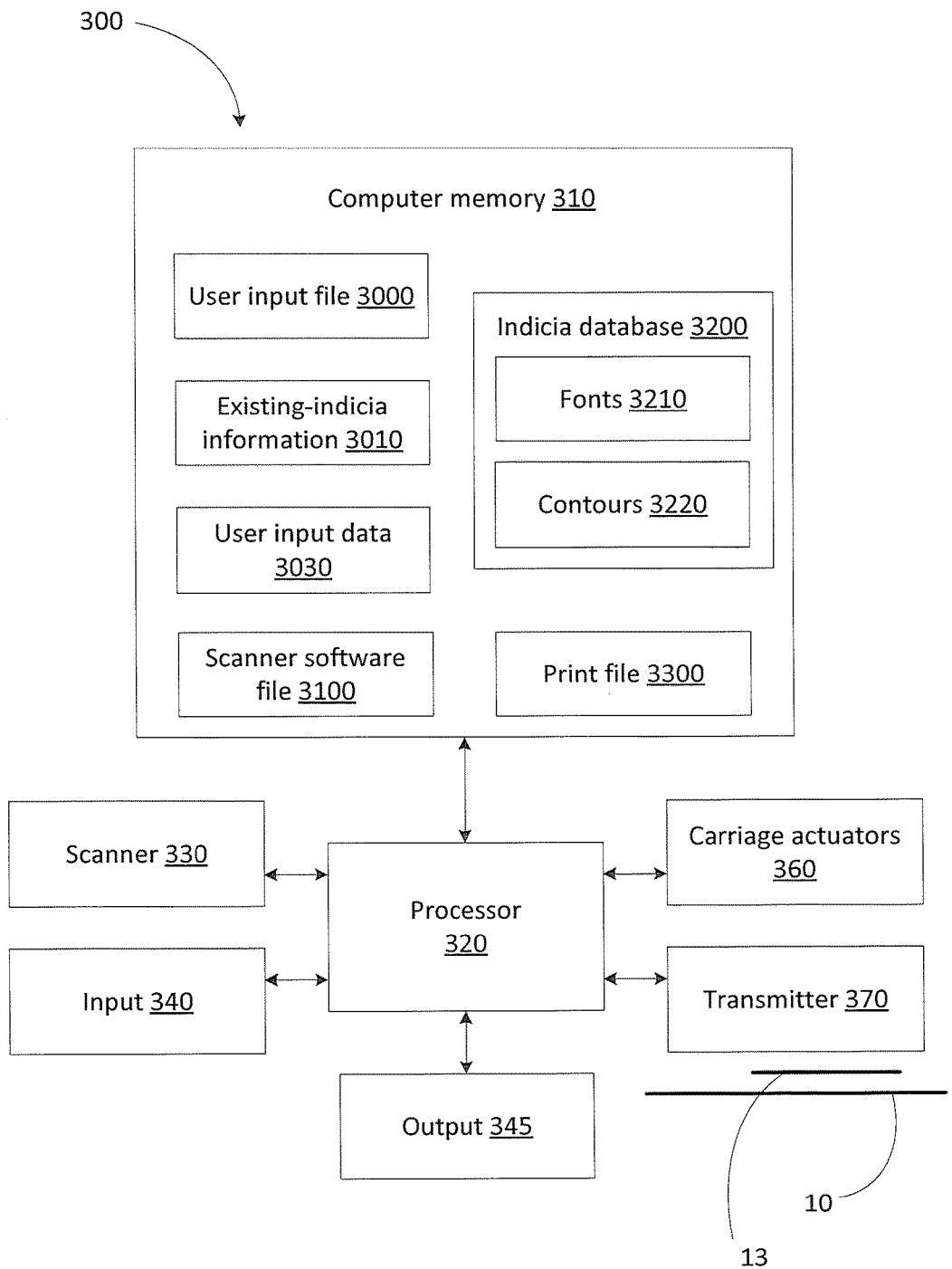
FIG. 12 is a block diagram illustrating a mobile printer according to still another embodiment of the current invention.

FIG. 12 illustrates (in use with stationary indicia-receiving material 10 and a transfer sheet 13) another mobile printer 300 that is substantially similar to the embodiment 100, except as specifically noted and/or shown, or as would be inherent. Further, those skilled in the art will appreciate that the embodiment 100 (and thus the embodiment 300) may be modified in various ways, such as through incorporating all or part of any of the various described embodiments, for example. For uniformity and brevity, reference numbers from 300 to 399 may be used to indicate elements corresponding to those discussed above numbered from 100 to 199 (e.g., computer memory 310 corresponds generally to the computer memory 110, processor 320 corresponds generally to the processor 120, scanner 330 corresponds generally to the scanner 130, input 340 corresponds generally to the input 140, output 345 corresponds generally to the output 145, carriage actuators 360 correspond generally to the carriage actuators 160, et cetera), though with any noted, shown, or inherent deviations. And reference numbers 3000 to 3999 may be used to indicate elements corresponding to those discussed above numbered from 1000 to 1999 (e.g., user input file 3000 corresponds generally to the user input file 1000, existing-indicia information 3010 corresponds generally to the existing-indicia information 1010, user input data 3030 corresponds generally to the user input data 1030, scanner software file 3100 corresponds generally to the scanner software file 1100, the indicia database 3200 corresponds generally to the indicia database 1200, font information 3210 corresponds generally to the font information 1210, contour information 3220 corresponds generally to the contour information 1220, and print file 3300 corresponds generally to the print file 1300), though with any noted, shown, or inherent deviations.

Embodiment 300 replaces the printing unit 170 with a transmitter 370 configured to transmit focused waves (e.g., a laser or other light-wave transmitter, an RF transmitter or other electromagnetic radiation transmitter, an ultrasound transmitter or other propagated wave transmitter, or transceiver, et cetera). The transmitter 370 is in data communication with the processor 320 and is coupled to the carriage for movement by the carriage actuators 360. The mobile printer 300 utilizes a transfer sheet 13 overlying the stationary indicia-receiving material 10. The transfer sheet 13 is configured to change pigmentation of areas of the indicia-receiving material 10 underlying areas of the transfer sheet 13 receiving focused waves, and the transmitter 370 is configured complementary to the transfer sheet 13 such that activation of the transmitter 370 causes the transfer sheet 13 to change pigmentation of areas of the indicia-receiving material 10 underlying areas of the transfer sheet 13 receiving focused waves from the transmitter 370.

The scanner 330 of the mobile printer 300 may include a camera located outside the housing inner area, and multiple cameras or other scanners 330 may be utilized (including some inside the housing inner area).

Use of the mobile printer 300 is substantially similar to use of the mobile printer 100, except that the transfer sheet 13 is paced over the indicia-receiving material 10 and the transmitter 370 transmits focused waves to the transfer sheet 13, which in turn alters the pigmentation of the indicia-receiving material 10 as desired (instead of emitting ink from the printing unit 170).

Figure 13:
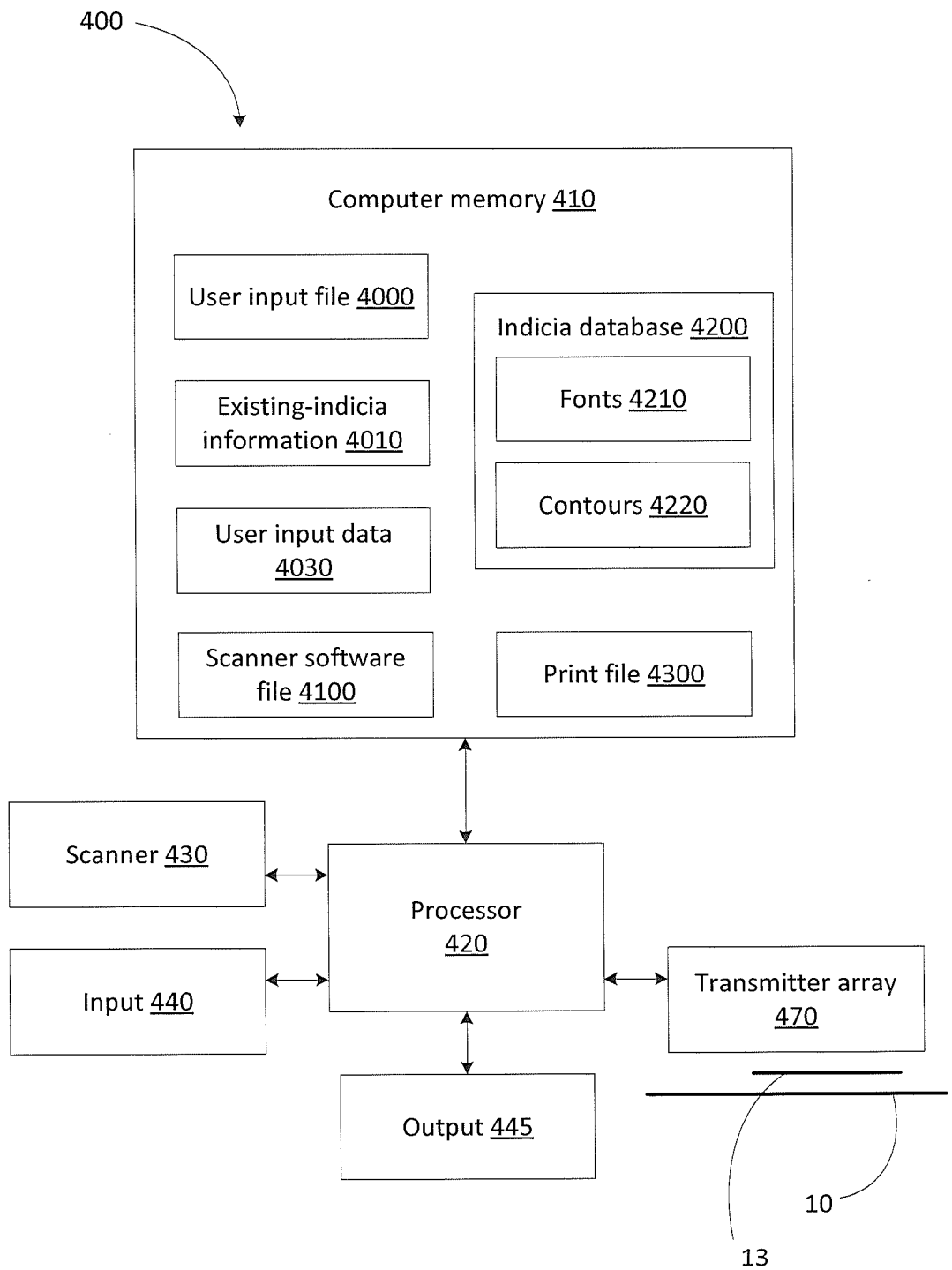
FIG. 13 is a block diagram illustrating a mobile printer according to yet another embodiment of the current invention.

FIG. 13 illustrates (in use with stationary indicia-receiving material 10 and a transfer sheet 13) another mobile printer 400 that is substantially similar to the embodiment 300, except as specifically noted and/or shown, or as would be inherent. Further, those skilled in the art will appreciate that the embodiment 300 (and thus the embodiment 400) may be modified in various ways, such as through incorporating all or part of any of the various described embodiments, for example. For uniformity and brevity, reference numbers from 400 to 499 may be used to indicate elements corresponding to those discussed above numbered from 300 to 399 (e.g., computer memory 410 corresponds generally to the computer memory 310, processor 420 corresponds generally to the processor 320, scanner 430 corresponds generally to the scanner 330, input 440 corresponds generally to the input 340, output 445 corresponds generally to the output 345, et cetera), though with any noted, shown, or inherent deviations. And reference numbers 4000 to 4999 may be used to indicate elements corresponding to those discussed above numbered from 3000 to 3999 (e.g., user input file 4000 corresponds generally to the user input file 3000, existing-indicia information 4010 corresponds generally to the existing-indicia information 3010, user input data 4030 corresponds generally to the user input data 3030, scanner software file 4100 corresponds generally to the scanner software file 3100, the indicia database 4200 corresponds generally to the indicia database 3200, font information 4210 corresponds generally to the font information 3210, contour information 4220 corresponds generally to the contour information 3220, and print file 4300 corresponds generally to the print file 3300), though with any noted, shown, or inherent deviations.

In embodiment 400, the transmitter 470 includes a stationary array of transmitters in the housing inner area, and does not include a carriage or carriage actuators corresponding to the carriage and the carriage actuators 360. In use, the processor 420 activates (either in series or parallel) the desired transmitters 470 in the stationary array in accordance with the print file 4300 to transmit focused waves to the transfer sheet 13, which in turn alters the pigmentation of the indicia-receiving material 10 as desired.

Figure 14:
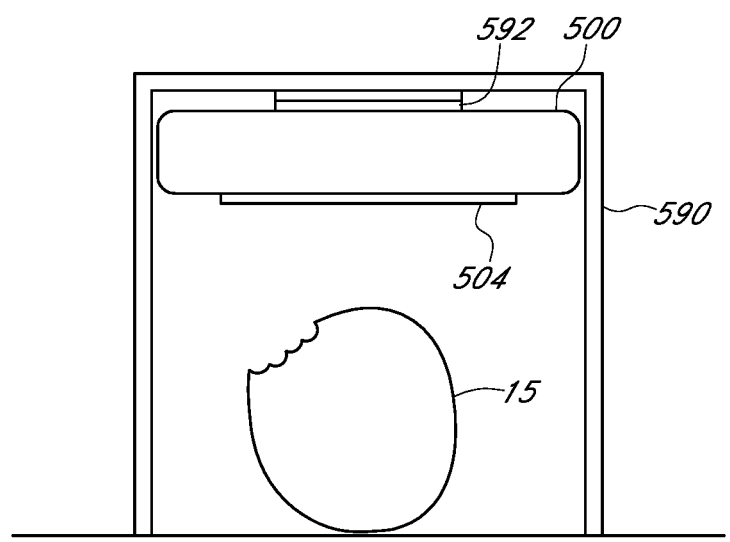
FIG. 14 is a side view of a mobile printer according to another embodiment of the invention.
Figure 15:
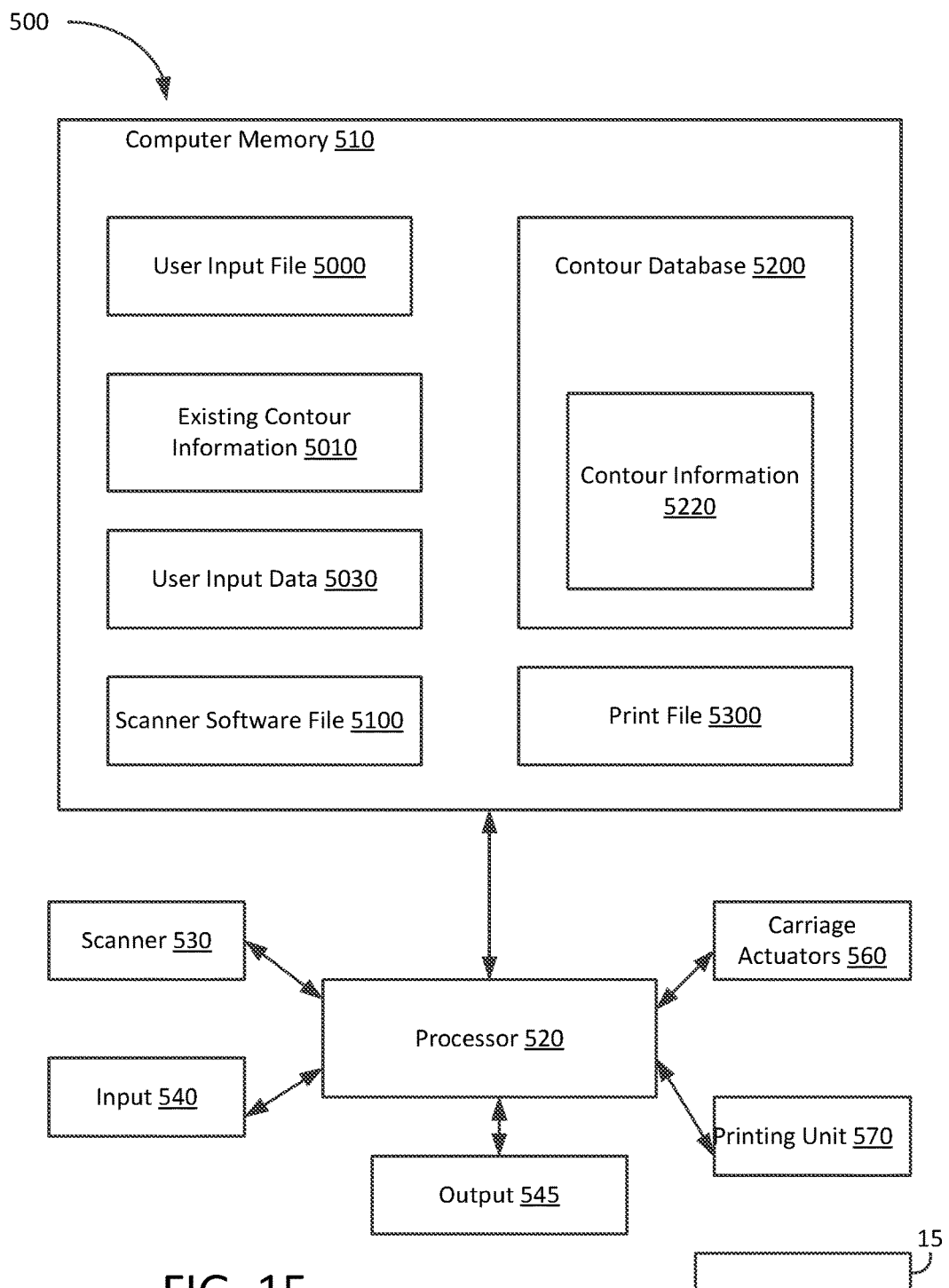
FIG. 15 is a block diagram illustrating aspects of the mobile printer of FIG. 14.

FIGS. 14-15 illustrate another mobile printer 500 which is substantially similar to the embodiment 100, except as specifically noted and/or shown, or as would be inherent. Further, those skilled in the art will appreciate that the embodiment 100 (and thus the embodiment 500) may be modified in various ways, such as through incorporating all or part of any of the various described embodiments, for example. For uniformity and brevity, reference numbers from 500 to 599 may be used to indicate elements corresponding to those discussed above numbered from 100 to 199 (e.g., computer memory 510 corresponds generally to the computer memory 110, processor 520 corresponds generally to the processor 120, scanner 530 corresponds generally to the scanner 130, input 540 corresponds generally to the input 140, output 545 corresponds generally to the output 145, et cetera), though with any noted, shown, or inherent deviations. And reference numbers 5000 to 5999 may be used to indicate elements corresponding to those discussed above numbered from 1000 to 1999 (e.g., user input file 5000 corresponds generally to the user input file 1000; existing-shape information 5010 corresponds generally to the existing-indicia information 1010; user input data 5030 corresponds generally to the user input data 1030; scanner software file 5100 corresponds generally to the scanner software file 1100; the contour database 5200 corresponds generally to the indicia database 1200, though here, the contour database 5200 includes, for example, information allowing specific contours of a component piece 15 to be recognized; contour information 5220 corresponds generally to the contour information 1220, although here, the contour information includes, for example, geometric routines for matching/filling lines in the existing contour of the component piece 15, and for creating other lines/shapes on the component 15; and print file 5300 corresponds generally to the print file 1300), though with any noted, shown, or inherent deviations.

In embodiment 500, the printer is configured to behave as a three-dimensional (3D) printer with the ability to add or adhere material to (or decimate material from) an existing component piece 15 based on the component's 15 then-existing shape. Accordingly, in embodiment 500, the existing-indicia information 1010 is replaced with existing-shape information 5010. The existing-shape information may include, for example, the general shape of a product or component piece 15 that requires additive material to either supplement the component 15, or to fix a component 15 that may be broken. Font information 1210 is not required in embodiment 500, as it may be unnecessary, although in embodiments, font information 5210 may be present. The print file 5300 is similar to print file 1300, although here, the print file 5300 is configured for three-dimensional printing on the component piece 15.

Because the printer 500 is configured for additive printing, the carriage 550 may be equipped with extendable legs, or may be provided within a frame 590 (e.g., via a temporary adhering mechanism 592, such as an adhesive, or a hook-and-look fastener or the like). The printing unit 570 is coupled to and movable with the carriage 550, as described above. The printing unit 570 may include an output nozzle 572, a supply passage 574 for supplying material from a reservoir 580 to the output nozzle 572, and a nozzle actuator 575 in communication with the processor 520 for causing the material to pass from the output nozzle 572.

Programming, for example in the scanner software file 5100, causes the scanning device 530 to obtain (in some embodiments, repeatedly obtain) the existing-contour information 5010 for the component piece, and causes the obtained information 5010 to be stored. Other programming (e.g., in the user input file 5000) allows input data 5030 to be obtained through the input 540 and stored. The input data 5030 may include, for example, desired textual and non-textual indicia to be printed on the component piece in addition to the additive material being added thereto. And still other programming causes the processor 520 to create the print file 5300 based on data from the existing-indicia information 5010, the user input data 5030, and the contour database 5200. And using the print file 5300, the processor 520 causes the carriage actuators 560 to selectively move the carriage in a defined manner and causes the nozzle actuator 575 to expel the material from the output nozzle 572 to apply the material to the component piece. If the existing-contour information 5010 is repeatedly obtained, programming may compare the obtained existing-indicia information 5010 to identify movement of the housing 501 relative to the component piece 15—allowing adjustments to be made in the 3D printing process.

Figure 16:
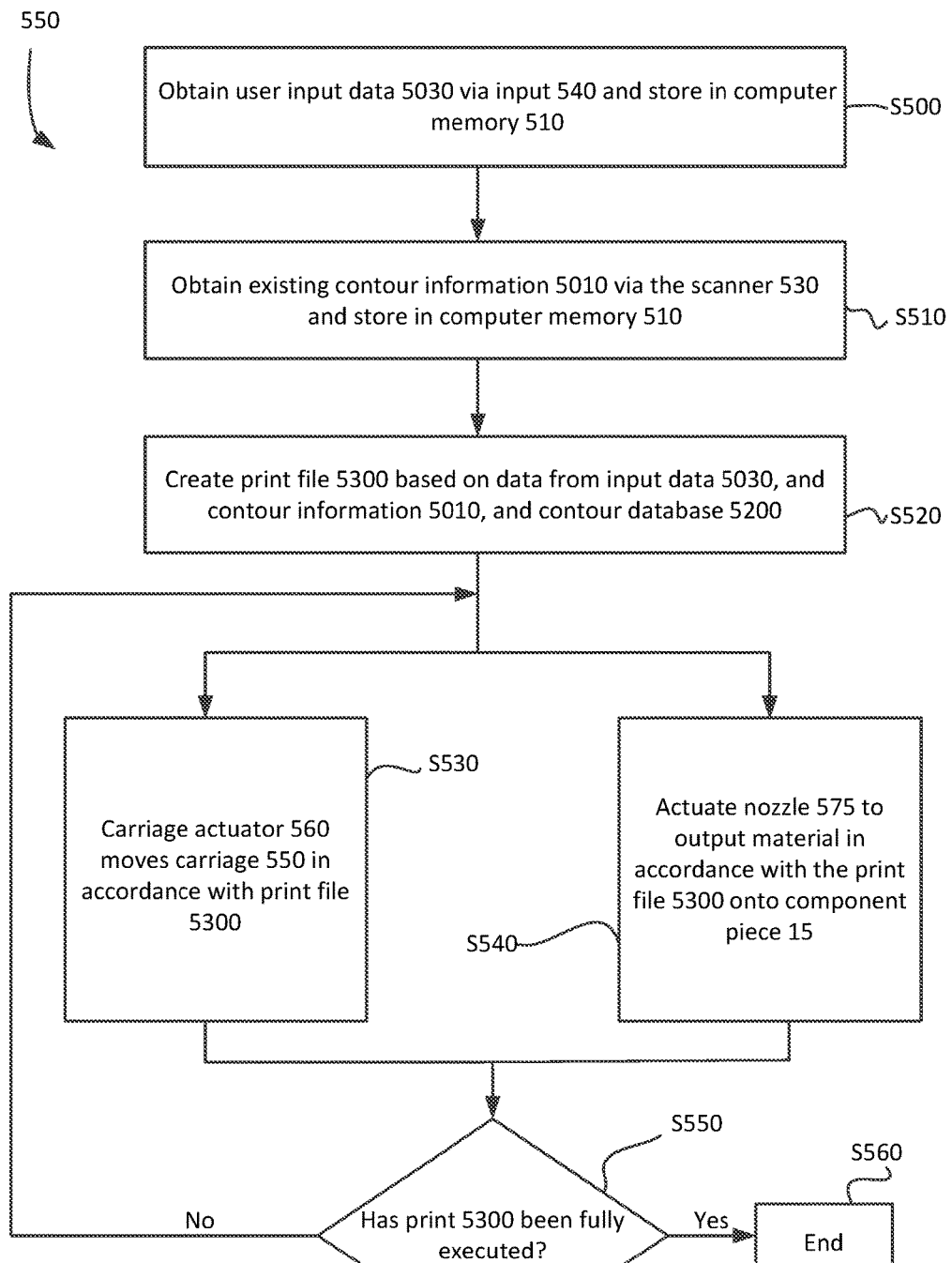
FIG. 16 is a flowchart illustrating various steps performed by the mobile printer of FIG. 14.

The following description, illustrated in FIG. 16, is an example of the mobile printer 500 in use with a component piece 15 according to an embodiment. At step S500 of method S50, the processor 520 obtains user input data 5030 via the input 540 and stores the user input data 5030 in the computer memory 510. And at step S510, the processor 520 obtains existing-contour information 5010 via the scanner 530 and stores the existing-indicia information 5010 in the memory 510. At step S520, the processor 520 creates print file 5300 based on data from the existing-contour information 5010, the user input data 5030, and the contour database 5200.

After step S520, the process S50 proceeds to steps S530 and S540. There, the processor 520 causes the carriage actuators 560 to move the carriage 550 in accordance with the print file 5300, and causes the nozzle actuator 575 to selectively allow the material to flow through the supply passage 574 and the output nozzle 572 to apply the material to the component piece. After steps S530 and S540, the processor 520 determines at S550 if the print file 5300 has been fully executed for the material. If not, the process S50 returns to steps S530 and S540; if so, the process S50 ends at step S560.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims. The specific configurations and contours set forth in the accompanying drawings are illustrative and not limiting. Some steps may be performed in different orders than described herein.

The invention claimed is:

1. A mobile printer for use with a stationary piece of paper, the mobile printer comprising:
    a non-transitory computer memory;
    a processor in data communication with the computer memory;
    an input device in data communication with the processor;
    a housing configured to rest atop the paper;
    a scanning device coupled to the housing and positioned to obtain existing-indicia information, the scanning device being in data communication with the processor;
    an ink reservoir;
    a stationary array of output nozzles in communication with the ink reservoir;
    means in data communication with the processor for causing the ink to pass from the stationary array of output nozzles;
    an indicia database accessible by the processor, the indicia database having font and contour information;
    programming causing the scanning device to obtain the existing-indicia information;
    programming causing the computer memory to store the obtained existing-indicia information;
    programming causing the processor to create a print file based on data from each of:
        (a) the obtained existing-indicia information;
        (b) input data obtained by the processor from the input device; and
        (c) the indicia database; and
    programming selectively actuating the means for causing ink from the ink reservoir to pass from the stationary array of output nozzles, whereby applying the ink to the paper;
    wherein the programming selectively actuating the means for causing the ink to pass from the output nozzle utilizes the print file; and
    wherein the existing-indicia information comprises at least one of tone information, contour information, and font information.

2. The mobile printer of claim 1, wherein the scanning device comprises a camera.

3. The mobile printer of claim 1, wherein the means in data communication with the processor for causing the ink to pass from the output nozzle is a heater.

4. The mobile printer of claim 1, wherein the means in data communication with the processor for causing the ink to pass from the output nozzle is a piezoelectric actuator.

5. The mobile printer of claim 1, wherein the non-transitory computer memory is a distributed non-transitory computer memory, such that one portion of the non-transitory computer memory is physically separate from another portion of the non-transitory computer memory.

6. The mobile printer of claim 1, wherein the processor is a distributed processor, such that one portion of the processor is physically separate from another portion of the processor.

7. The mobile printer of claim 1, further comprising:
    programming causing the scanning device to repeatedly obtain updated existing-indicia information;
    programming causing the computer memory to store the updated existing-indicia information; and
    programming comparing the stored existing-indicia information to identify movement of the housing relative to the paper.

8. A mobile printer for use with stationary indicia-receiving material, the mobile printer comprising:
a non-transitory computer memory;
a processor in data communication with the computer memory;
an input device in data communication with the processor;
a housing configured to rest adjacent the indicia-receiving material;
a scanning device coupled to the housing and positioned to obtain existing-indicia information, the scanning device being in data communication with the processor, wherein the existing-indicia information comprises at least one of tone information, contour information, and font information;
an ink reservoir;
an output nozzle in communication with the ink reservoir;
a nozzle actuator in data communication with the processor;
an indicia database accessible by the processor, the indicia database having font and contour information;
programming causing the scanning device to obtain the existing-indicia information;
programming causing the computer memory to store the obtained existing-indicia information;
programming causing the processor to create a print file based on data from each of:
  (a) the obtained existing-indicia information;
  (b) input data obtained by the processor from the input device; and
  (c) the indicia database;
programming selectively activating the nozzle actuator for causing ink from the ink reservoir to pass from the output nozzle, whereby applying the ink to the indicia-receiving material; wherein the programming selectively activating the nozzle actuator utilizes the print file;
programming causing the scanning device to obtain updated existing-indicia information;
programming causing the computer memory to store the updated existing-indicia information; and
programming comparing the stored updated existing-indicia information with the existing-indicia information and the print file to identify subsequent movement of the housing relative to the paper.

9. The mobile printer of claim 8, wherein the scanning device comprises a camera.

10. The mobile printer of claim 8, wherein the non-transitory computer memory is a distributed non-transitory computer memory, such that one portion of the non-transitory computer memory is physically separate from another portion of the non-transitory computer memory.

11. The mobile printer of claim 8, wherein the processor is a distributed processor, such that one portion of the processor is physically separate from another portion of the processor.

12. The mobile printer of claim 8, wherein the indicia-receiving material is a piece of paper.

13. A mobile printer for use with a separable transfer sheet overlying a stationary indicia-receiving material; the transfer sheet being configured to change pigmentation of areas of the indicia-receiving material underlying areas of the transfer sheet receiving focused waves; the mobile printer comprising:
a non-transitory computer memory;
a processor in data communication with the computer memory;
an input device in data communication with the processor;
a housing configured to rest adjacent the indicia-receiving material;
a scanning device coupled to the housing and positioned to obtain existing-indicia information, the scanning device being in data communication with the processor;
a transmitter in data communication with the processor;
programming causing the scanning device to obtain the existing-indicia information;
programming causing the computer memory to store the obtained existing-indicia information; and
programming selectively activating the transmitter to cause the transfer sheet to change pigmentation of areas of the indicia-receiving material underlying areas of the transfer sheet receiving focused waves from the transmitter.

14. The mobile printer of claim 13, wherein the transmitter comprises at least one item selected from the group consisting of a light-wave transmitter, an electromagnetic radiation transmitter, and a sound-wave transmitter.

15. The mobile printer of claim 14, further comprising:
a carriage located inside the housing; and
carriage actuators for moving the carriage laterally and transversely, the carriage actuators being in data communication with the processor;
wherein the transmitter is coupled to and movable with the carriage.

16. The mobile printer of claim 14, wherein the transmitter is part of a stationary array of transmitters in data communication with the processor.

17. The mobile printer of claim 13, wherein the housing has an inner area and the transmitter is located in the housing inner area.

18. The mobile printer of claim 17, wherein the scanning device is located outside the housing inner area.

19. The mobile printer of claim 17, wherein the scanning device includes a camera located outside the housing inner area and a camera located inside the housing inner area.

20. The mobile printer of claim 17, further comprising a door movable to selectively expose and cover the inner area.

21. A mobile printer, comprising:
a housing configured to rest atop a paper having existing-indicia information printed thereon, the existing-indicia information comprising at least one of tone information and font information;
a scanning device coupled to the housing and positioned to obtain the existing-indicia information, the scanning device being in data communication with the processor;
a carriage located inside the housing;
carriage actuators for moving the carriage laterally and transversely adjacent the paper;
a printing unit coupled to and movable with the carriage; the printing unit comprising an output nozzle, a supply passage for supplying ink from an ink reservoir to the output nozzle, and means for causing the ink to pass from the output nozzle; and
a processor in data communication with non-transitory computer memory, an input device, and an indicia database comprising front and contour information, the computer memory comprising programming having machine readable instructions that, when effectuated by the processor, perform the following steps:
  (a) causing the scanning device to obtain the existing-indicia information from the paper;
  (b) causing the computer memory to store the obtained existing-indicia information;
  (c) accessing the indicia database;
  (d) receiving input data from the input device;

(e) creating a print file based on data from each of:
  i. the existing-indicia information;
  ii. the indicia database; and
  iii. the input data from the input device;
(f) causing the carriage actuators to selectively move the carriage based on the print file; and
(g) selectively actuating the means for causing the ink to pass from the output nozzle based on the print, whereby applying the ink to the paper.

22. The mobile printer of claim 21, wherein the scanning device comprises a camera.

23. The mobile printer of claim 21, wherein the means in data communication with the processor for causing the ink to pass from the output nozzle is a heater.

24. The mobile printer of claim 21, wherein the means in data communication with the processor for causing the ink to pass from the output nozzle is a piezoelectric actuator.

25. The mobile printer of claim 21, wherein the non-transitory computer memory is a distributed non-transitory computer memory, such that one portion of the non-transitory computer memory is physically separate from another portion of the non-transitory computer memory.

26. The mobile printer of claim 21, wherein the processor is a distributed processor, such that one portion of the processor is physically separate from another portion of the processor.

27. The mobile printer of claim 21, further comprising:
  programming causing the scanning device to repeatedly obtain updated existing-indicia information;
  programming causing the computer memory to store the updated existing-indicia information; and
  programming comparing the stored existing-indicia information to identify movement of the housing relative to the paper.

* * * * *